US011556172B1

(12) United States Patent
Stevens et al.

(10) Patent No.: US 11,556,172 B1
(45) Date of Patent: Jan. 17, 2023

(54) VIEWPOINT COORDINATION ON ARTIFICIAL REALITY MODELS

(71) Applicant: Meta Platforms Technologies, LLC, Menlo Park, CA (US)

(72) Inventors: Jasper Stevens, London (GB); Etienne Pinchon, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 22 days.

(21) Appl. No.: 17/131,579

(22) Filed: Dec. 22, 2020

(51) Int. Cl.
*G06F 3/01* (2006.01)
*G06F 3/04815* (2022.01)

(52) U.S. Cl.
CPC .............. *G06F 3/013* (2013.01); *G06F 3/017* (2013.01); *G06F 3/04815* (2013.01)

(58) Field of Classification Search
CPC ....... G06F 3/013; G06F 3/017; G06F 3/04815
See application file for complete search history.

(56) References Cited

U.S. PATENT DOCUMENTS

| | | | |
|---|---|---|---|
| 9,841,814 B1 * | 12/2017 | Kallmeyer | G06V 40/18 |
| 9,959,676 B2 | 5/2018 | Barzuza et al. | |
| 10,298,587 B2 * | 5/2019 | Hook | G06Q 50/01 |
| 10,499,033 B2 | 12/2019 | Pesonen | |
| 10,554,931 B1 | 2/2020 | Zavesky et al. | |
| 10,582,191 B1 | 3/2020 | Marchak, Jr. et al. | |
| 10,952,006 B1 | 3/2021 | Krol et al. | |
| 11,140,361 B1 | 10/2021 | Krol et al. | |
| 2002/0158873 A1 | 10/2002 | Williamson | |
| 2011/0107270 A1 * | 5/2011 | Wang | G16H 20/40 703/11 |
| 2015/0279044 A1 | 10/2015 | Kim et al. | |

(Continued)

FOREIGN PATENT DOCUMENTS

WO    2020117657 A1    6/2020

OTHER PUBLICATIONS

K. Gupta, G. A. Lee and M. Billinghurst, "Do You See What I See? The Effect of Gaze Tracking on Task Space Remote Collaboration," in IEEE Transactions on Visualization and Computer Graphics, vol. 22, No. 11, pp. 2413-2422, Nov. 2016, doi: 10.1109/TVCG.2016.2593778. (Year: 2016).*

(Continued)

*Primary Examiner* — James T Tsai
(74) *Attorney, Agent, or Firm* — Potomac Law Group, PLLC

(57) ABSTRACT

Methods and systems described herein are directed to viewpoint coordination of multiple users on artificial reality collaboration models. Multiple users can collaborate on 3D models in an artificial reality environment. Attention indicators can indicate to the other users where a user is looking or where the user is pointing. In some implementations, there is a central model that each user sees from her own perspective (e.g., in the center of a virtual table all users are seated around) and/or instances of the model that only an individual user sees or can manipulate. The user's attention indicators can be based on where the user is looking or pointing on the model instances. Additionally, attention indicators can be translated from a controlling user's perspective to a coordinate system defined by the model, which allows the indicators to be then presented in that model coordinate system for all users.

19 Claims, 13 Drawing Sheets

(56) References Cited

U.S. PATENT DOCUMENTS

| | | | |
|---|---|---|---|
| 2017/0257405 A1* | 9/2017 | Lo ........................ | G06Q 10/101 |
| 2018/0101989 A1 | 4/2018 | Frueh et al. | |
| 2018/0144212 A1 | 5/2018 | Burgos et al. | |
| 2018/0158246 A1 | 6/2018 | Grau et al. | |
| 2018/0234671 A1 | 8/2018 | Yang et al. | |
| 2019/0045157 A1 | 2/2019 | Venshtain et al. | |
| 2019/0058870 A1 | 2/2019 | Rowell et al. | |
| 2019/0279424 A1* | 9/2019 | Clausen ................ | G06T 19/003 |
| 2019/0346522 A1 | 11/2019 | Botnar et al. | |
| 2020/0090350 A1 | 3/2020 | Cho et al. | |
| 2020/0118342 A1 | 4/2020 | Varshney et al. | |
| 2020/0142475 A1* | 5/2020 | Paez ...................... | G06F 3/147 |
| 2020/0279411 A1 | 9/2020 | Atria et al. | |
| 2020/0371665 A1* | 11/2020 | Clausen ................. | G06T 19/20 |
| 2021/0019541 A1 | 1/2021 | Wang et al. | |
| 2021/0248727 A1 | 8/2021 | Fisher et al. | |
| 2021/0263593 A1* | 8/2021 | Lacey .................. | G02B 27/017 |
| 2021/0390767 A1 | 12/2021 | Johnson et al. | |

OTHER PUBLICATIONS

International Search Report and Written Opinion for International Application No. PCT/US2021/038992, dated Oct. 29, 2021, 16 pages.
Unknown., "A Better Way to Meet Online," Gather, https://www.gather.town/, Last Accessed Oct. 11, 2021.

* cited by examiner

VIEWPOINT COORDINATION ON ARTIFICIAL REALITY MODELS

TECHNICAL FIELD

The present disclosure is directed to methods and systems for collaborating on 3D objects in artificial reality.

BACKGROUND

Artificial reality environments can be provided by a variety of systems, such as projectors, head mounted displays, "cave" systems, etc. Users can interact with an artificial reality environment by selecting objects, moving, rotating, resizing, actuating controls, changing colors or skins, defining interactions between virtual objects, setting virtual forces to act on virtual objects, or practically any other imaginable action. Various interaction modalities exist for taking such actions in an artificial reality environment. For example, some systems can employ one or more of gaze controls, hand-held hardware devices, gesture controls, wearable devices (e.g., wrist bands), voice controls, etc. For example, in some cases a user operating in an artificial reality environment can view and move a virtual object using commands issued via hand-held controller devices.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
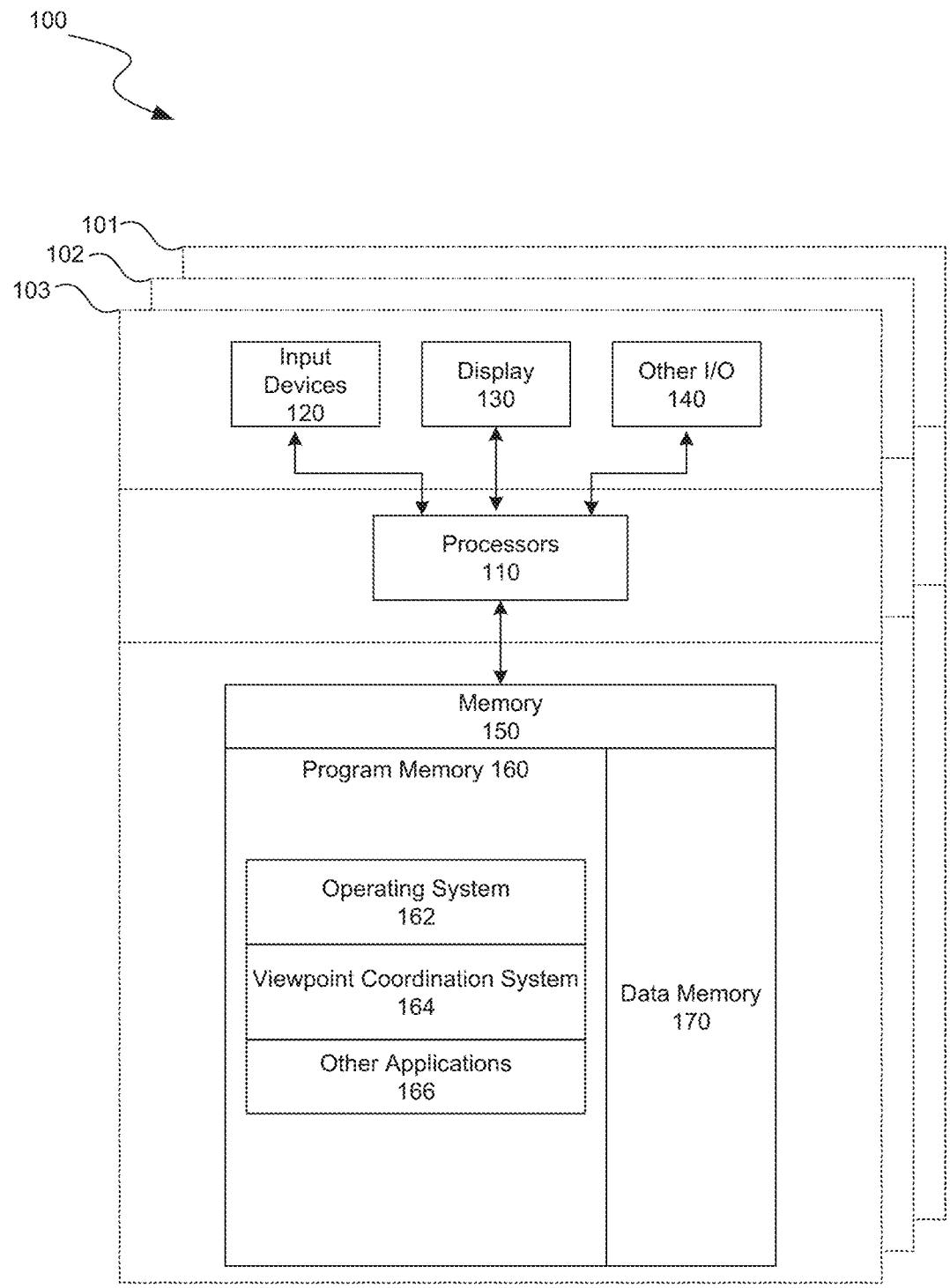
FIG. 1 is a block diagram illustrating an overview of devices on which some implementations of the present technology can operate.

Aspects of the present disclosure are directed to viewpoint coordination of multiple users on artificial reality collaboration models. Multiple users (remotely or in the same physical space) can collaborate on 3D models (e.g., collaboration objects) in an artificial reality environment. In some cases, body language queues (e.g., gesturing, gaze direction, etc.), are less available, making it difficult for multiple users to communicate effectively about a subject 3D model (e.g., a central instance of the 3D model). User attention indicators can be attached to a shared 3D model, providing each user the ability to freely manipulate (e.g., rotate, reposition, or resize) their instance of the model, while seeing which part of the central model the other collaborators are looking at.

Attention indicators can indicate where a user is looking or, when the user's hand is within a threshold distance of the 3D model, where the user is pointing. In some implementations, there is a central model that each user sees from her own perspective (e.g., in the center of a virtual table all users are seated around) and/or instances of the model that only an individual user sees/can manipulate. The user's attention indicators are based on where the user is looking on the model instance. The attention indicators can have various configurations, such as cones, arrows, or miniature avatars. A model can become the central model in different ways. For example, when a user picks up the model, activates a control on the model, selects the model (e.g., with a collaboration tool), moves the model to the center of collaboration table or other specified location; automatically upon determinations of user attention on the model; or when the model is handed to another user. In some implementations, attention indicators can be notes or annotations. In some cases, attention indicators can be asynchronous (e.g., shared without a live collaboration session). Attention indicators can be translated from a controlling user's perspective to a coordinate system defined by the model, this allows the indicators to be then presented in that model coordinate system for all users.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer).

Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In existing artificial reality environments, coordinate systems of multiple users do not align, making it impossible for users to collaborate when an object has different coordinates in each user's virtual space. The present embodiments can improve computing and/or computer system processing by viewpoint coordination between multiple users in an artificial reality environment. The present embodiments create a conversion transform to translate a first user's attention vector into a collaboration object space so other users can see an attention indicator of where the first user is looking or pointing on a collaboration object. The present embodiments of viewpoint coordination can improve computing efficiency by reducing the wireless or wired communications in the artificial reality system by presenting attention indicators on a collaboration object, which eliminates the need for users to communicate where each user is looking or pointing on the collaboration object. In addition, the technical processes used in the disclosed artificial reality technology can provide increased communication and understanding between multiple users. In some implementations, this can include the coordination between multiple XR devices, such that a shared artificial reality environment is presented to each user of their own XR device, with attention indicators shown by one XR device based on gaze, head, and/or hand position detected by the other XR device(s).

Several implementations are discussed below in more detail in reference to the figures. FIG. 1 is a block diagram illustrating an overview of devices on which some implementations of the disclosed technology can operate. The devices can comprise hardware components of a computing system 100 that are capable of processing AR viewpoint coordination of AR models. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, viewpoint coordination system 164, and other application programs 166. Memory 150 can also include data memory 170 that can include viewpoint data, central instance data, individual instance data, collaboration data, manipulation data, attention indication data, object attention vector data, user attention vector data, collaboration object space data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
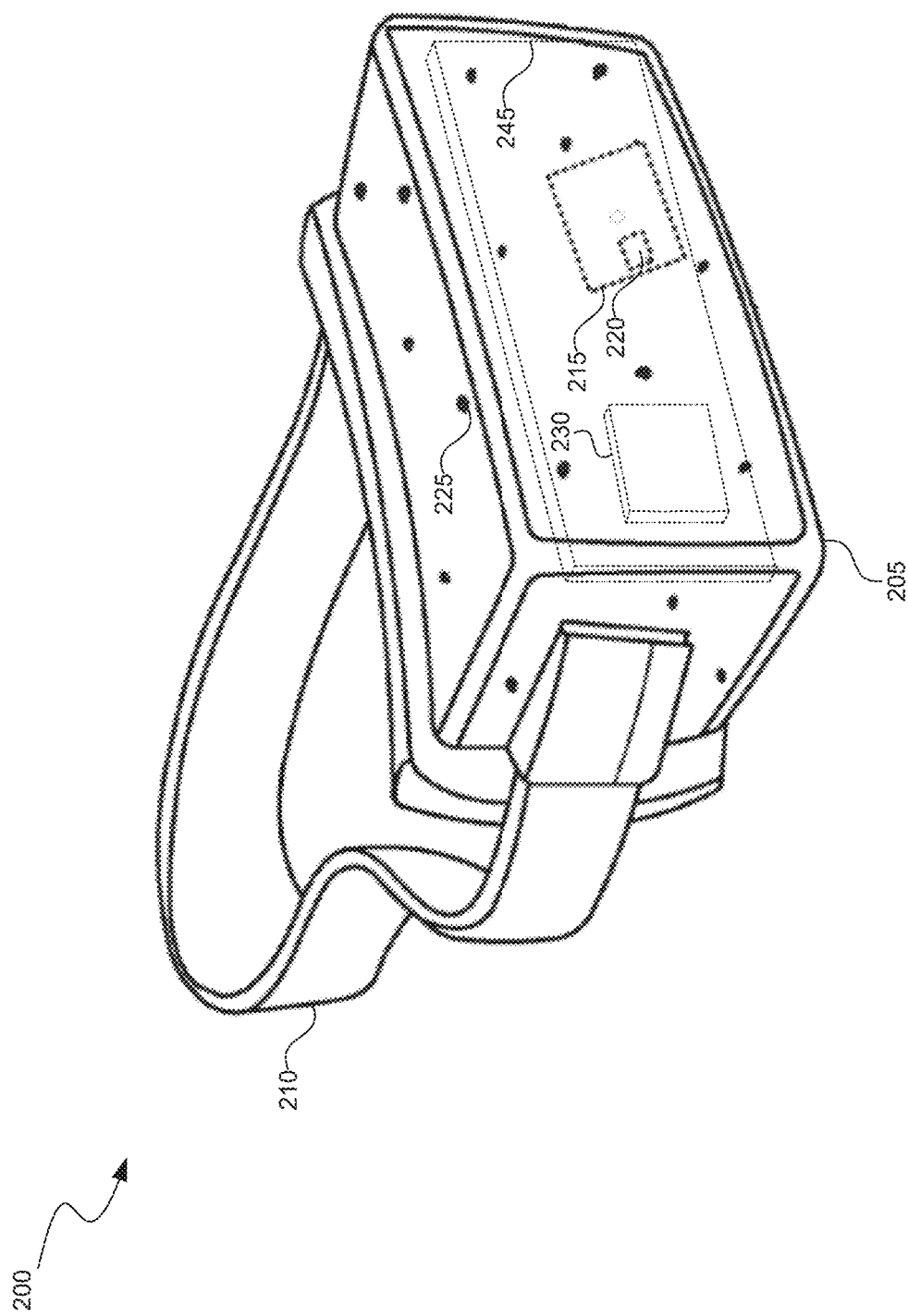
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
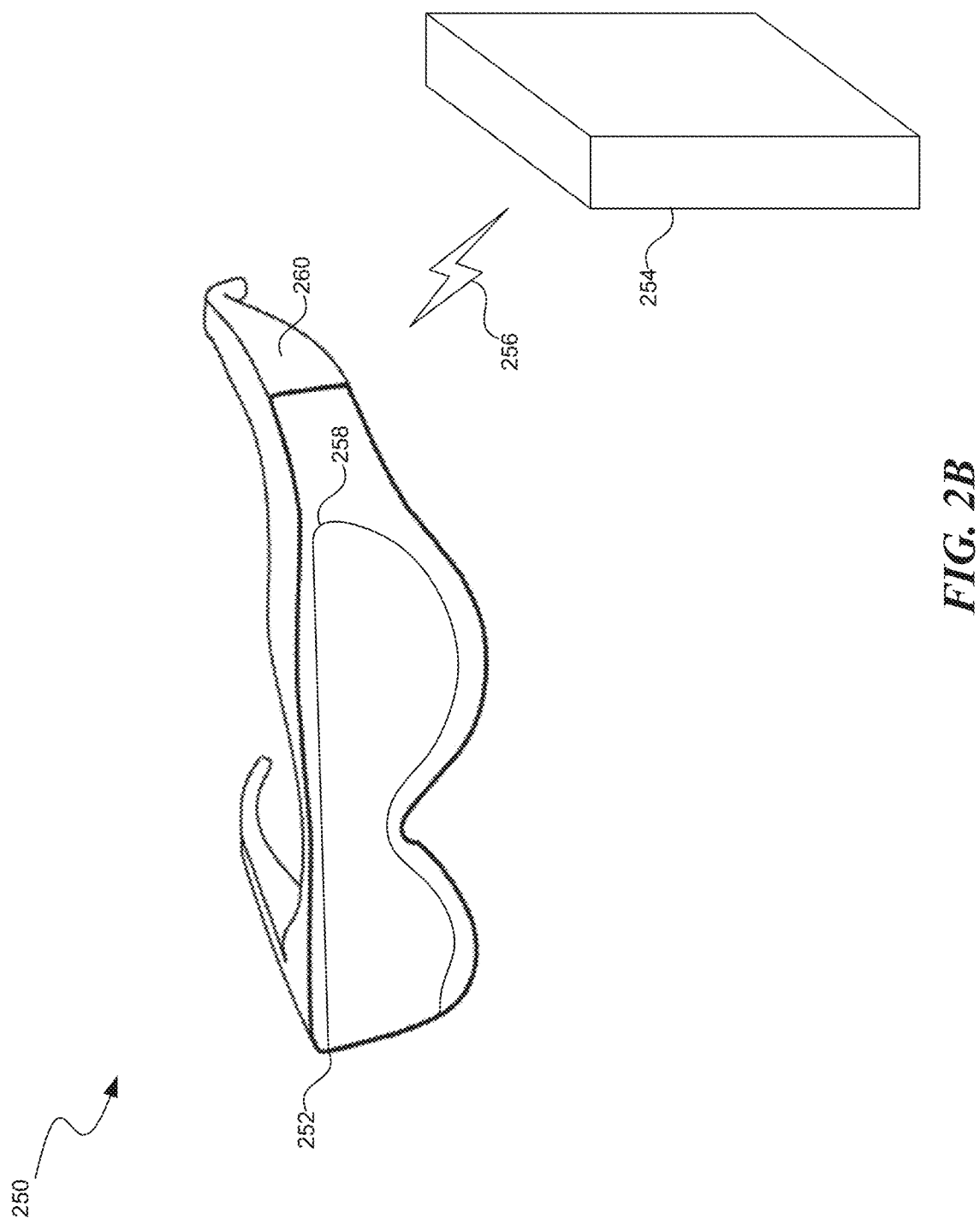
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
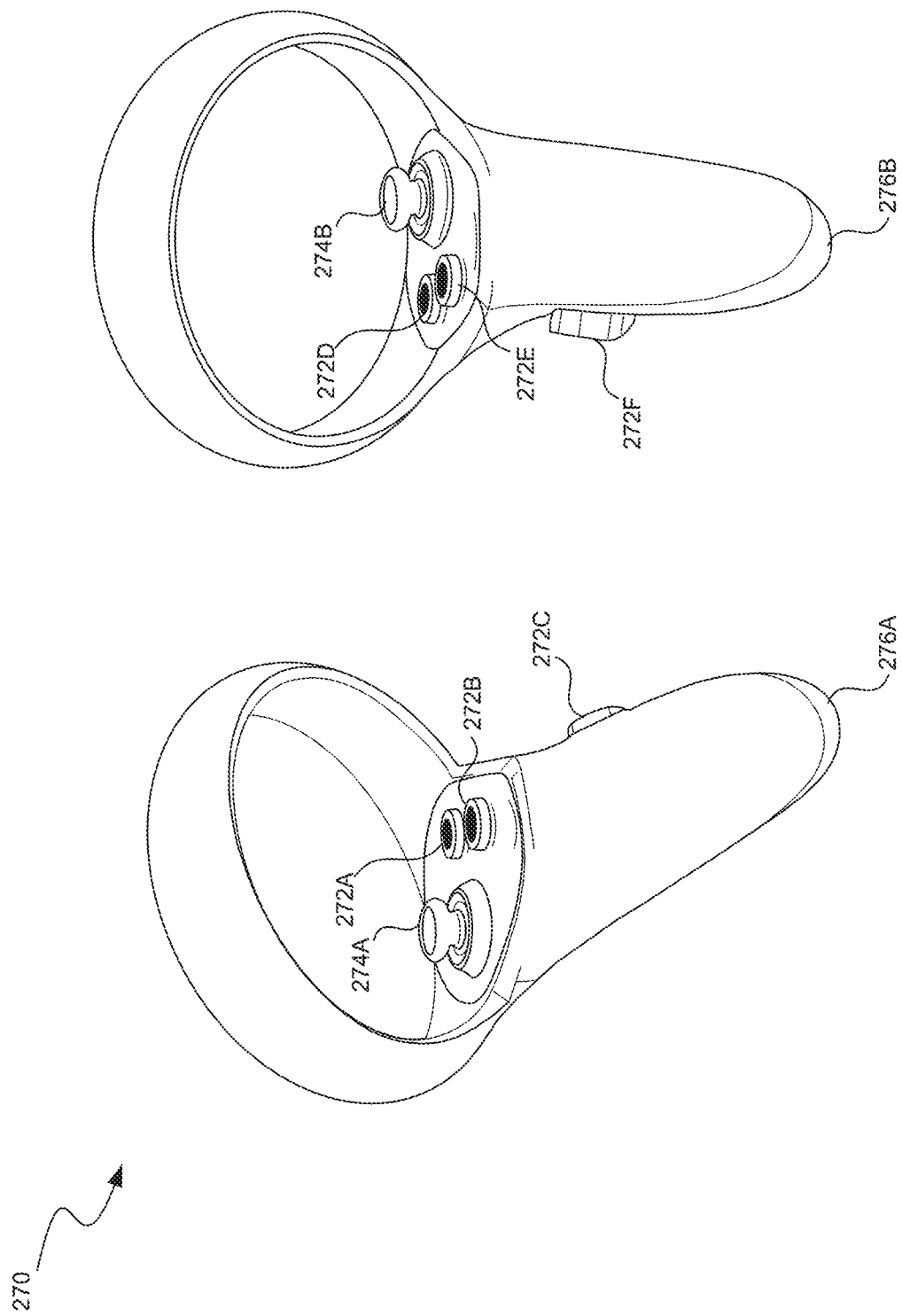
FIG. 2C is a wire diagram illustrating controllers which can be used in some implementations of the present technology.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
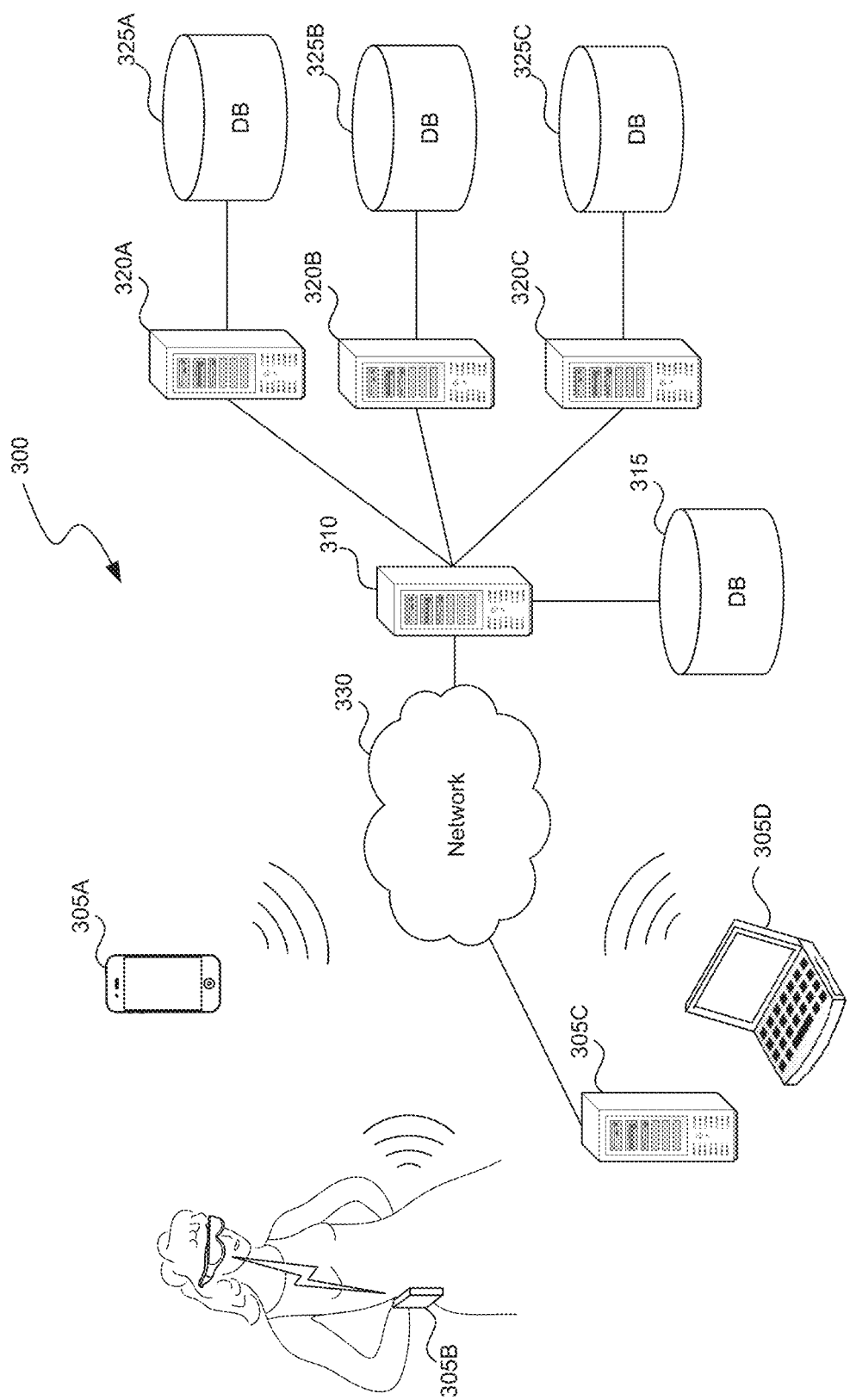
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
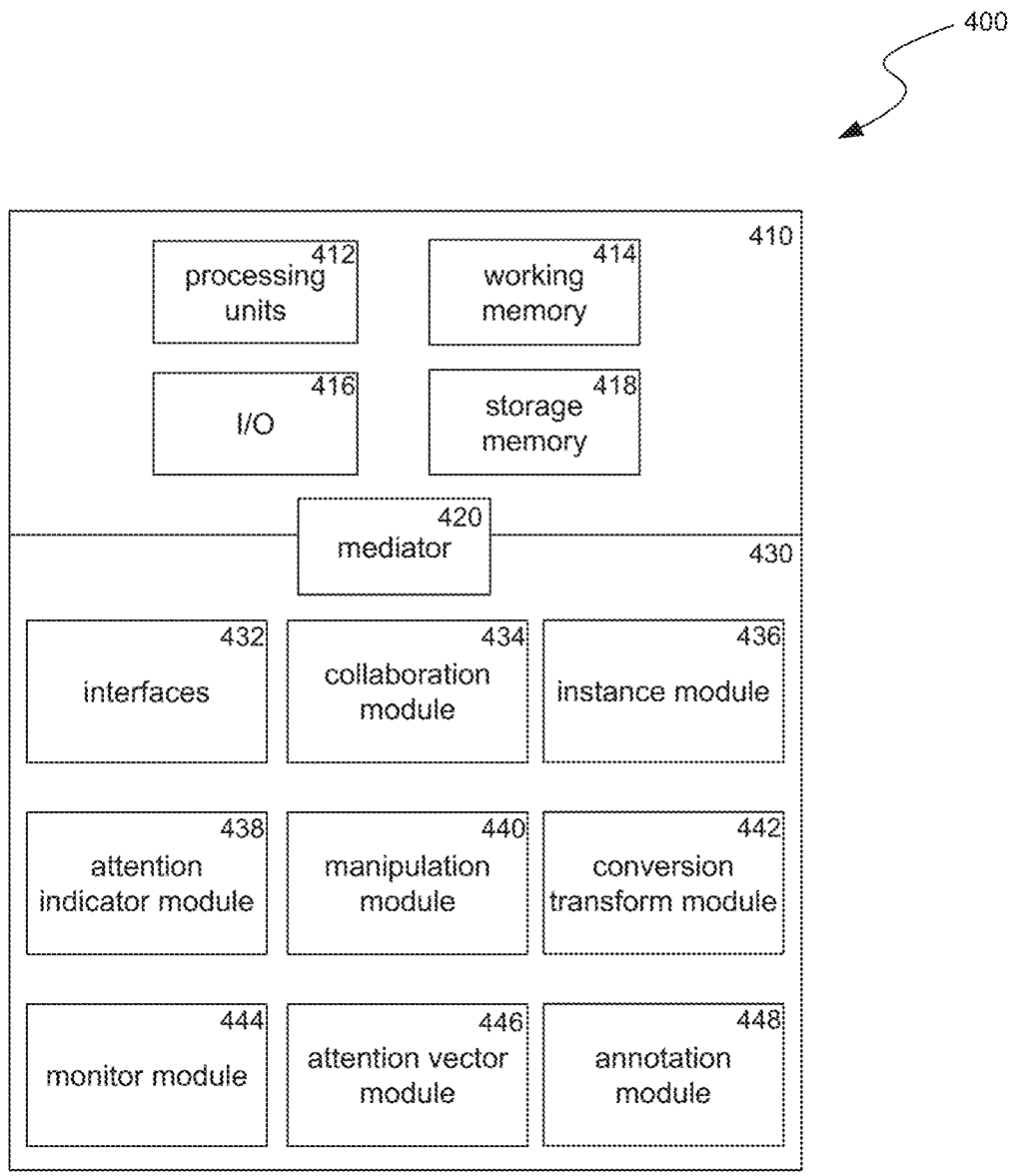
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for viewpoint coordination in an artificial reality environment. Specialized components 430 can include collaboration module 434, instance module 436, attention indicator module 438, manipulation module 440, conversion transform module 442, monitor module 444, attention vector module 446, annotation module 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

In some embodiments, the collaboration module 434, can identify one or more collaboration objects shared between multiple users in an artificial reality environment. The multiple users can collaborate in a physical or virtual collaboration session in which a collaboration object is displayed. Additional details on collaboration are provided below in relation to block 502 in FIG. 5. In some embodiments, the instance module 436 can generate a central instance and an individual instance for each of the collaboration objects. The central and individual instances can allow multiple users to view or manipulate the object without impacting the collaboration object. Additional details on instances are provided below in relation to block 502 in FIG. 5 and block 602 in FIG. 6.

In some embodiments, the attention indicator module 438, can update, based on the monitored attention of the one or more of the multiple users, one or more user attention indicators on a version of the one or more collaboration objects. Attention indicators can be a cone, arrow, user hand, mini avatar, dot, or any identification shape that indicates where the user or multiple users are looking or pointing. Additional details on attention indicators are provided below in relation to block 506 in FIG. 5 and block 606 in FIG. 6. In some embodiments, the manipulation module 440, can manipulate the individual or central instance of the collaboration object. A user can manipulate (e.g., modify, change, or edit) an individual instance without affecting the position/orientation of the central instance of the collaboration object. Additional details on manipulation are provided below in relation to blocks 602 and 604 in FIG. 6.

In some embodiments, the conversion transform module 442 can obtain a conversion transform by comparing a collaboration object space, defined by the one or more collaboration objects, to the user space. The conversion transform module 442 can apply the conversion transform to the user attention vector to obtain the object attention vector. Additional details on the conversion transform are provided below in relation to blocks 704 and 706 in FIG. 7. In some embodiments, the monitor module 444, can monitor an attention of one or more of the multiple users on the central instance or the individual instance to determine user attention indicators. The monitor module 444 can monitor interactions of the one or more of the multiple users to update a configuration of the individual instance. Additional details on monitoring are provided below in relation to blocks 504 and 506 in FIG. 5 and block 604 in FIG. 6.

In some embodiments, the attention vector module 446 can obtain a user attention vector in a user space and obtain an object attention vector in the collaboration object space by applying the conversion transform to the user attention vector. Additional details on attention vectors are provided below in relation to blocks 702-708 of FIG. 7. In some embodiments, the annotation module 448 can receive, from one or more of the multiple users, a tag with an annotation on an instance of the one or more collaboration objects other than the version of the one or more collaboration objects. The tag on the central instance can be displayed on the version of the one or more collaboration objects. Additional details on annotations are provided below in relation to blocks 502 and 506 in FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
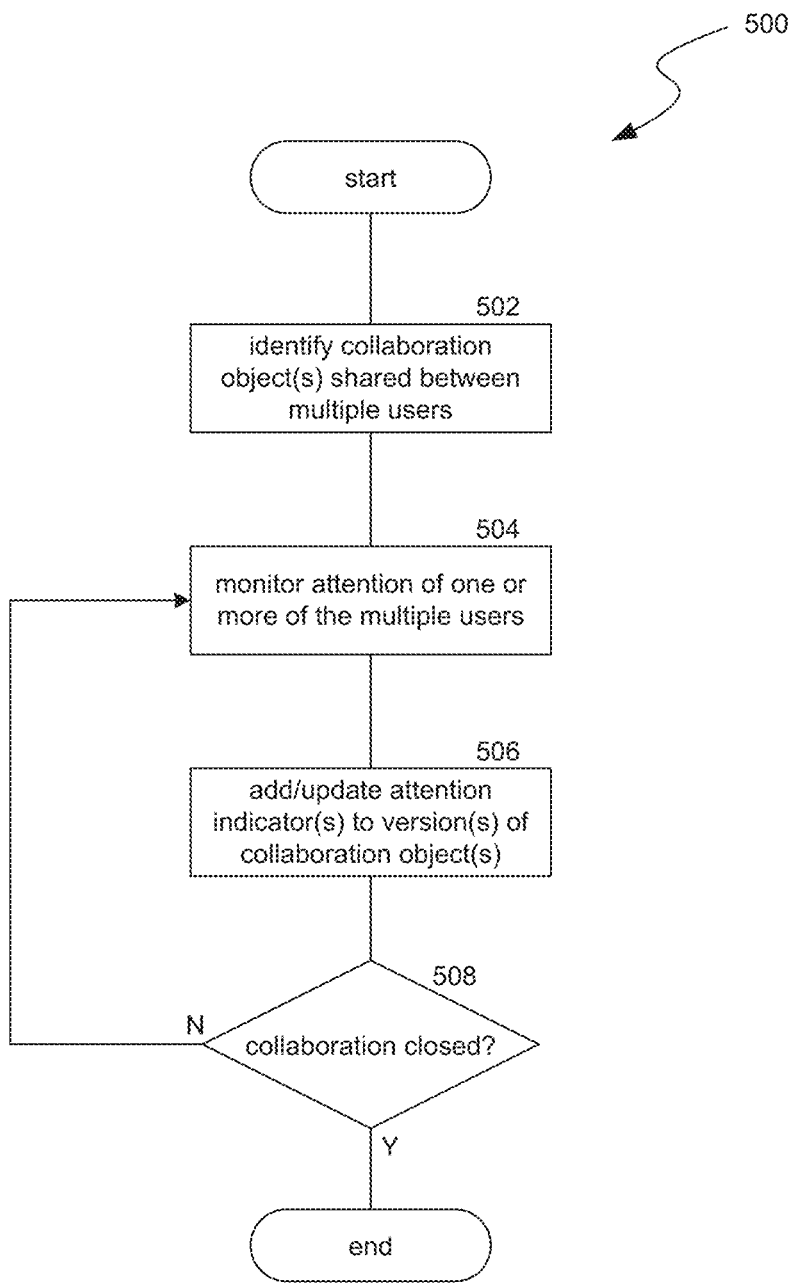
FIG. 5 is a flow diagram illustrating a process used in some implementations of the present technology for viewpoint coordination in artificial reality.

FIG. 5 is a flow diagram illustrating a process 500 used in some implementations for viewpoint coordination in artificial reality. Process 500 can be triggered by the user activating a viewpoint coordination mode, the user putting on an artificial reality headset, pressing a button on a control device, or process 500 can be always operating on an XR device and the user entering the artificial reality environment triggers viewpoint coordination. Process 500 can be performed locally on the XR device or performed by cloud-based device(s) that can support user collaboration.

At block 502, process 500 can identify one or more collaboration objects (e.g., a 3D model) shared between multiple users in an artificial reality environment. In some implementations, the collaboration objects, shared between the users, are physical objects and the users are in the same physical room, or the collaboration objects can be virtual objects. For example, the collaboration object can be a physical model or virtual model of a car in the middle of a table that all the users can see. In various cases, there can be a single collaboration object or multiple collaboration objects in the artificial reality collaboration environment.

In some implementations, the multiple users can view the collaboration object in a synchronous collaboration session. For example, the users can participate in a live collaboration session, such as a presentation or group meeting, in which the users collaborate on the 3D model. A user can make annotations on the collaboration object while in the synchronous collaboration session. In other implementations, the multiple users can view the collaboration object in an asynchronous collaboration session. For example, the users can individually view the collaboration object and leave notes or tag annotated comments on the collaboration object for the other users to view at a different time. An asynchronous collaboration session can increase convenience and time efficiency by not requiring multiple users to participate in the same collaboration session.

The artificial reality environment can include a central instance and/or an individual instance of each of the collaboration objects. As used herein, an object is a data structure, corresponding to something that can be displayed in an artificial reality environment. Also as used herein, an instance is a displayed version of an object. In some cases, there can be multiple displayed instances of the same object. Instances can have their own position, orientation, and sometimes size in the artificial reality environment. However, the content of the instances remains the same across all instances of the same object (i.e., a change to the object is reflected across all instances). Thus, the central and individual instances can be similar in appearance (e.g., a copy or replica) to the collaboration object. The central instance (or central model) of the collaboration object can be central to the artificial reality environment (e.g., centrally located among the users, such as the middle of a physical or virtual table). The central instance can have indicators (e.g., labels, markings, etc.) on it to identify to the users that it is the main object of discussion or collaboration. For example, the central instance can be bigger in size than the other instances, highlighted with an identifying color, or positioned in a display location. An instance of the collaboration object can become the central instance in different ways, such as when a user picks an object up, activates a control on the object, selects the object with a collaboration tool, or moves the object to central collaboration spot; automatically upon a determination that the user's attention is on the instance; or when an instance is handed to another user.

The artificial reality environment can include an individual instance of each of the collaboration objects. The individual instance can be a version of the 3D model which each user can manipulate (e.g., reposition, resize, etc.). In some cases, a user obtains an individual instance by peeling a copy from the central instance of the collaboration object or from another user's individual instance. The individual instance can be a replication of the central instance (e.g., the 3D mesh and skin of the individual instance matches the 3D mesh and skin of the central instance). In some cases, a user can see the individual instance of other users. In other cases, a user cannot see the individual instances of other users but instead can see her own individual instance and the central instance. In some implementations, the artificial reality environment has a central instance of a collaboration object and does not have individual instances.

At block 504, process 500 can monitor the attention of one or more of the multiple users on an instance of the collaboration object. Process 500 can monitor the attention of the users on the central instance or individual instance of the collaboration object. The attention can be tracked for all users or some of the users (e.g., attention can be monitored for a "presenter" in a synchronous collaboration session or for the users who have peeled off an individual instance of the collaboration object).

Process 500 can monitor attention of the user by monitoring the user's gaze and/or hand position. A user's gaze can comprise the location where the user is looking in an artificial reality environment. In some cases, the gaze of the user can be identified using input from external facing cameras that capture user eyes, using eye tracking technology. In some implementations, the gaze can also or alternatively be based on user head position (e.g., determined using sensors discussed above in relation to FIGS. 2A-2C).

User hand position can be monitored when the user's hand is within a distance threshold (e.g., every threshold amount of distance, such as every 0.5, 1, 2, 3 inches, etc.) of an instance of the collaboration object. When multiple users are in a collaboration session, a user can point to a location on the collaboration object to direct the attention of the multiple users to that point. A "hand position" as used herein refers to a location and/or pose. For example, a hand position can comprise one or both of where the hand is in an AR environment and/or the shape the hand is making. The processes described herein can monitor hand positions in different manners. In some cases, hand positions can be identified using input from external facing cameras that capture depictions of user hands. In other cases, hand positions can be based on input from a held or wearable device such as the controllers shown in FIG. 2C, a wearable glove, or wristband that tracks aspects of the user's hands. In some implementations, input can be interpreted as hand positions mapped as certain hand gestures by applying the input to a machine learning model trained to identify hand positions and/or gestures based on such input. In some implementations, heuristics or rules can be used to analyze the input to identify hand positions.

Figure 8B:
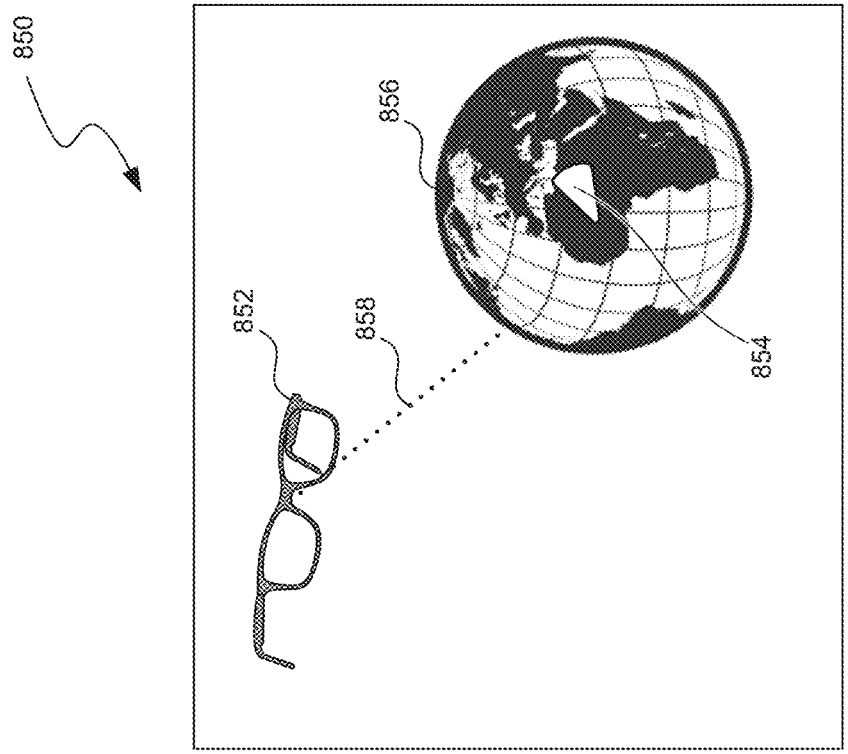
FIG. 8B is an illustration depicting the attention indicator of a second user on a collaboration object.
Figure 8A:
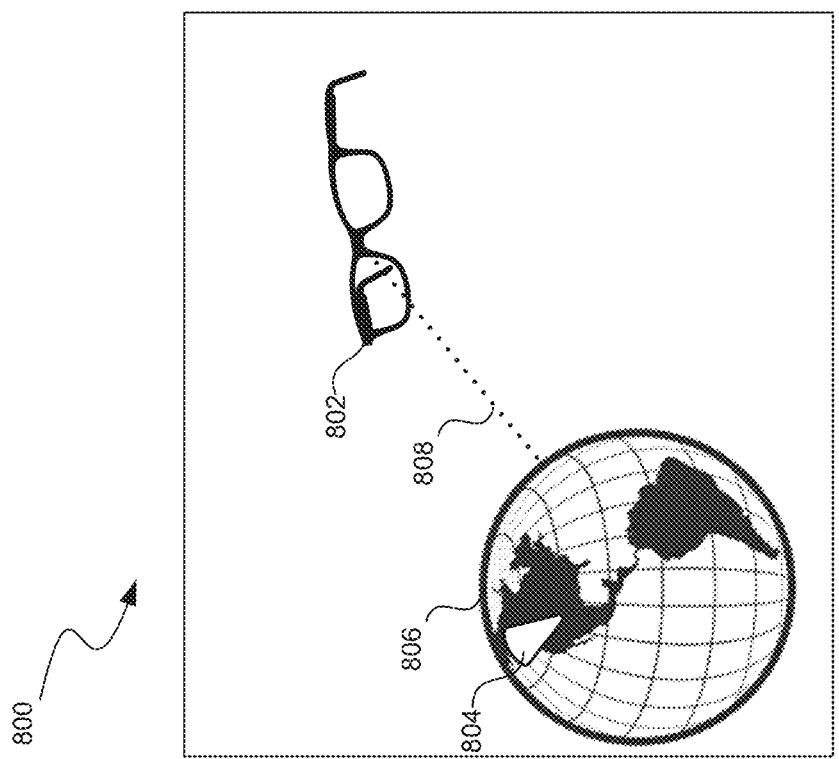
FIG. 8A is an illustration depicting the attention indicator of a first user on a collaboration object.

At block 506, process 500 can add or update, based on the monitored attention of the one or more of the multiple users, one or more user attention indicators on a version of the one or more collaboration objects. The user's attention (determined at block 504) can be translated into a space of the collaboration object to determine where to place the attention indicators on each instance of the collaboration object, e.g., using process 700 described below. The attention indicators added on the collaboration object instances can be presented as a cone, arrow, user hand, mini avatar, dot, or any identification shape. The attention indicators can illustrate where the user or multiple users are looking. FIGS. 8A and 8B illustrate where each user can see where the other user is focused on the collaboration object (e.g., central instance). FIG. 8A illustrates environment 800 where a first user wearing artificial reality headset 802 looks at Africa (as indicated by gaze line 808) on a first instance 806 of a globe collaboration object. FIG. 8B illustrates environment 850 where a second user wearing artificial reality headset 852 looks at North America (as indicated by gaze line 858) on a second instance 856 of the globe collaboration object. Attention indicator 804 indicates, to the first user, the location on the first instance 806 where the second user is gazing. Attention indicator 854 indicates, to the second user, the location on the second instance 856 where the first user is gazing.

In some implementations, an attention indicator can be updated to illustrate a user gaze when the user's gaze is fixed at a point on the collaboration object for a time threshold (e.g., every threshold amount of time, such as every 0.1, 0.5, or 1 second) or upon a command from that user. In other implementations, an attention indicator can continuously indicate the user current gaze. In various implementations, the attention indicators can display on only the central instance version, on only individual instance versions, or on both the central and individual instance versions. In some cases, the attention indicators can be an indicator of a user gaze or can link to an annotation the user specifies for an indicated spot. For example, a user can place an indicator (e.g., marker, label, dot, comment, drawing, etc.) on the collaboration object, to indicate to other users where to look on the collaboration object. In this example, the indicator is an annotation or note and not an indication where the user is currently gazing or pointing.

Figure 10B:
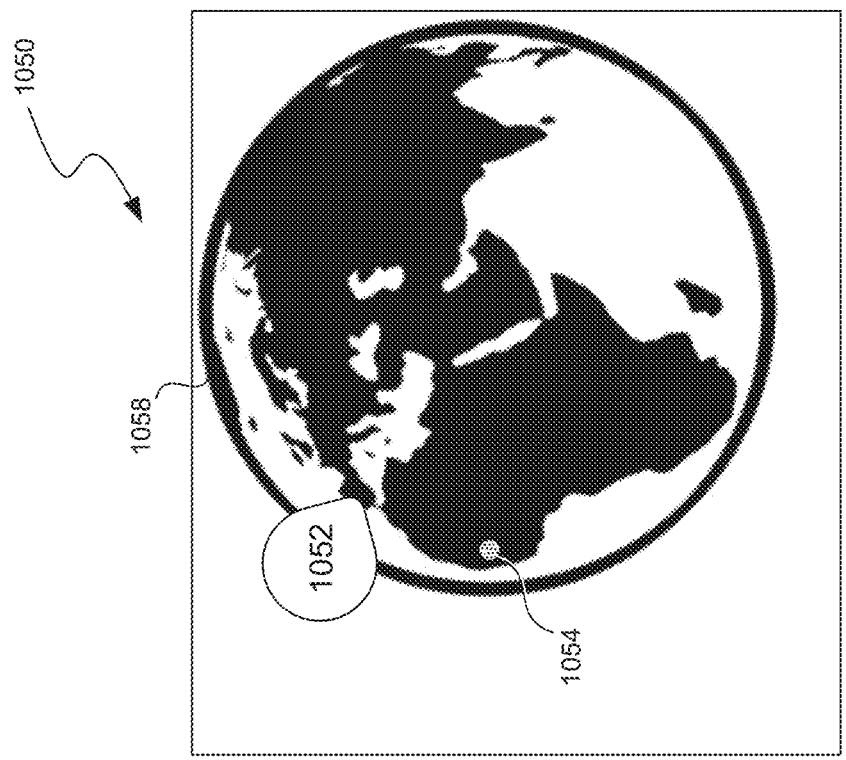
FIG. 10B is an illustration depicting the gaze of second user and a finger indicator of a first user on a collaboration object.
Figure 10A:
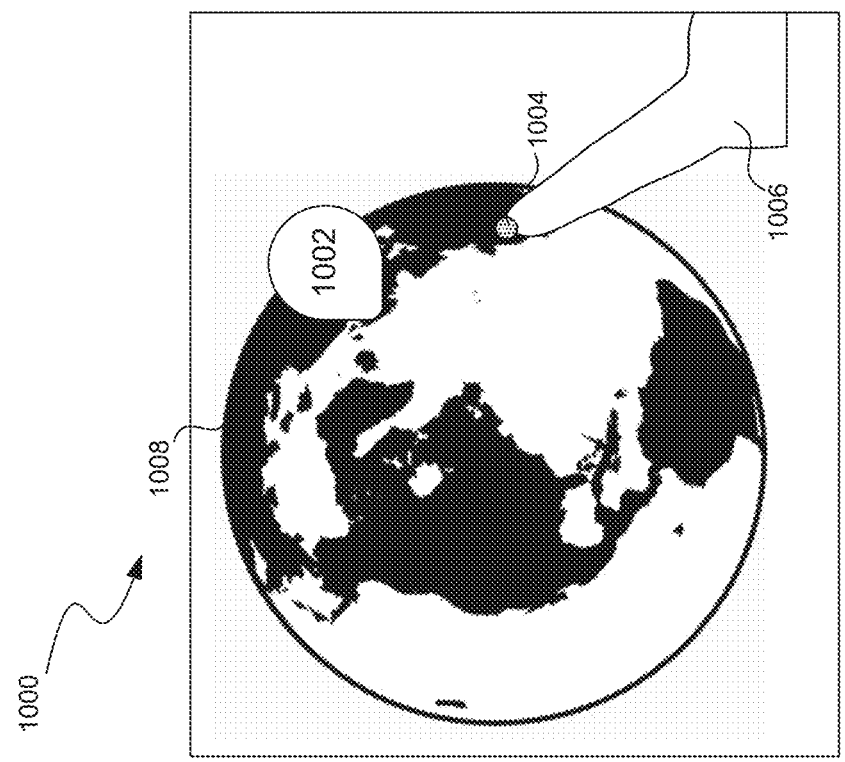
FIG. 10A is an illustration depicting the gaze and finger of a first user on a collaboration object.

FIGS. 10A and 10B illustrate both a user's gaze and hand position on an instance of a collaboration object (e.g., central instance or individual instance). FIG. 10A illustrates environment 1000 in which user 1006 points (illustrated by finger attention indicator 1004) and looks (illustrated by gaze attention indicator 1002) at an instance 1008 of a collaboration object. FIG. 10B illustrates environment 1050 with an instance 1058 of the collaboration object, seen by a second user other than user 1006. The second user sees gaze attention indicator 1052 corresponding to where user 1006 is looking and sees the finger attention indicator 1054 corresponding to finger attention indicator 1004.

At block 508, process 500 can determine whether the collaboration session between the multiple users has been closed, in which case process 500 can end. Otherwise, process 500 can return to block 504, where it continues to monitor the attention of one or more of the multiple users. A user can cease the collaboration session by clicking a button to end the collaboration session or leaving the artificial environment. In some implementations, the users can separate into sub-collaboration sessions during a main collaboration session. For example, all the users can participate in a collaboration session, such as a presentation on the collaboration object for a period of time and then divide the users into smaller groups to collaborate with versions of the collaboration object. A user can also change/add/remove which objects are the collaboration objects, so process 500 can go to block 502 instead of 504 to identify new collaboration objects.

Figure 6:
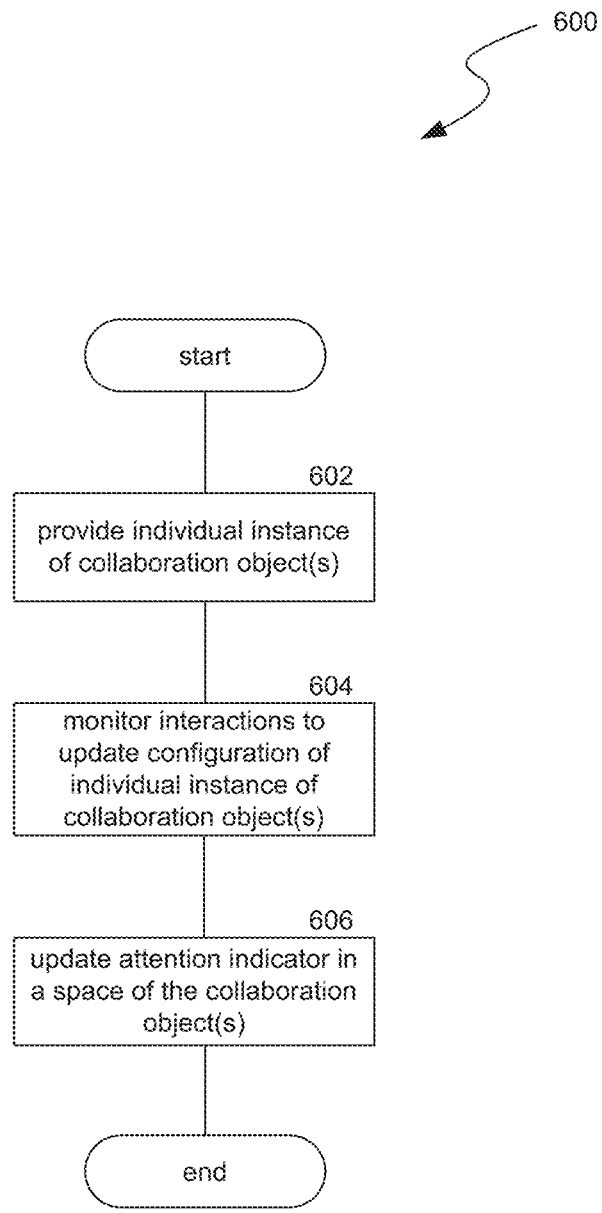
FIG. 6 is a flow diagram illustrating a process used in some implementations of the present technology for viewpoint coordination on individual instances of a collaboration object.

FIG. 6 is a flow diagram illustrating a process 600 used in some implementations for viewpoint coordination on individual instances of a collaboration object. Process 600 can be triggered by the user activating a viewpoint coordination mode; the user putting on artificial reality equipment or pressing a button on a control device; or process 600 is always operating and the user entering the artificial reality environment triggers viewpoint coordination. In some cases, process 600 can be a sub-process of process 500, e.g., calling process 600 at block 502 or at another time when an individual instance of a collaboration object is created. Process 600 can be performed locally on the XR device or performed by cloud-based device(s) that can support user collaboration.

Process 600 can identify one or more collaboration objects shared between multiple users. Each of the one of more collaboration objects can include a central instance or an individual instance. At block 602, process 600 can provide an individual instance of the collaboration object. Process 600 can create an individual instance of a collaboration object when a user peels off (grabs) the central collaboration object. For example, when a user grabs the central object, a replica (e.g., the 3D mesh and skin of the individual instance matching a 3D mesh and skin of the central instance) of the central object is reproduced in the hand of the user. In some cases, each of the multiple users can receive an individual instance in response to a selection of the collaboration objects, a user activating a control device, a voice command, a hand gesture, or at a user request. When the collaboration object includes a central instance, process 600 may or may not remove the central instance from the user's display, when creating the individual instance.

Figure 9:
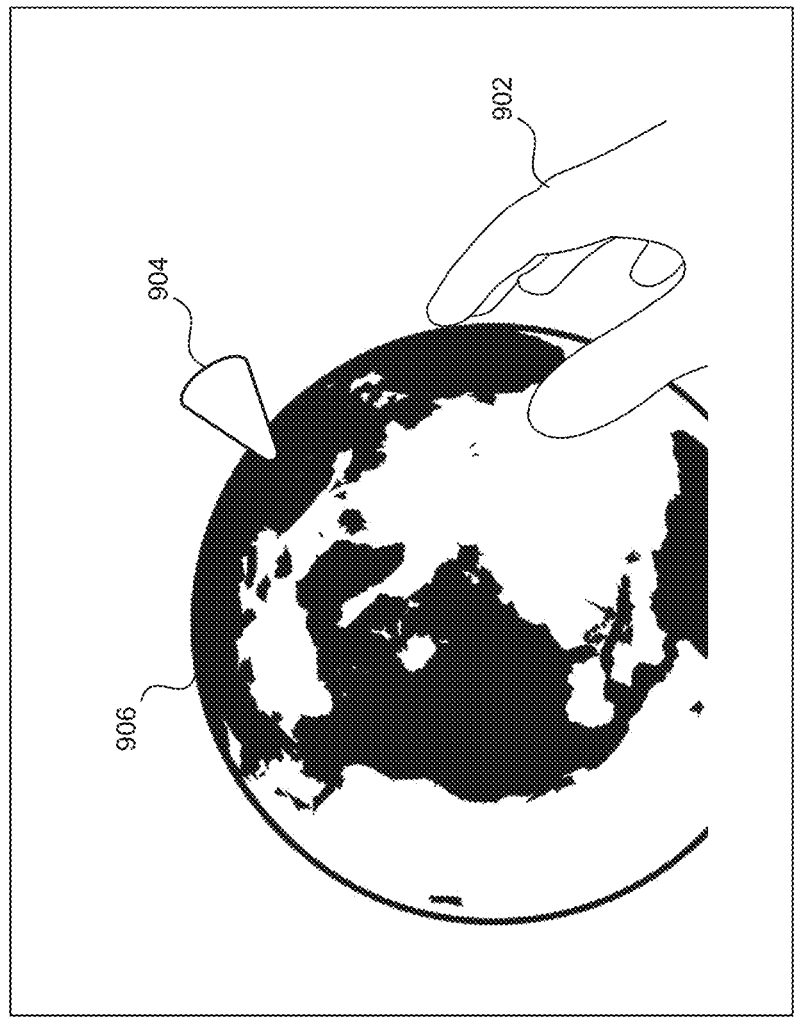
FIG. 9 is an illustration depicting the attention indicator of a first user on an individual instance manipulated by a second user.

In some implementations, a user can manipulate (e.g., modify, change, or edit) an individual instance without affecting the position/orientation of other instances (e.g., central instance or individual instances of other users). In other implementations, when a user manipulates her individual instance, process 600 can update the central instance based on the manipulated individual instance. In some cases, multiple users can separately manipulate their individual instance, and one of the manipulated individual instances can be chosen by the users to update the central instance. For example, if the collaboration object is a 3D model of a building, each of the multiple users can make modifications to her individual instance of the building. A user, in an authoritative role, may select an individual instance to update the central instance of the building (e.g., if the individual instance is a better design). In some cases, a user can manipulate her individual instance while seeing an indicator of the other user's attention on the individual instance. FIG. 9 illustrates environment 900 in which user 902 manipulates her individual instance 906, while seeing an attention indicator 904 of another user's attention (e.g., gaze or hand position).

At block 604, process 600 can monitor interactions (e.g., positioning, resizing, rotating, making changes to object, etc.) of the one or more of the multiple users to update a configuration of the individual instance of the collaboration object. In some cases, as a user manipulates the dimensions or orientation of an instance of the collaboration object (e.g., individual or central instance), process 600 can monitor and record how the dimensions or orientation of the version of the collaboration object have changed.

At block 606, process 600 can update attention indicators in a collaboration object space defined for the one or more collaboration objects. The collaboration object space can be a virtual or physical location, in which users participate in a collaboration session. Process 600 can update the attention indicators to reflect a change in a user's gaze or hand position on the version of the collaboration object. In some cases, process 600 can update a second user attention indicator on the version of the one or more collaboration objects based on the first user attention indicator in the collaboration object space (as illustrated in FIGS. 10A and 10B).

Figure 7:
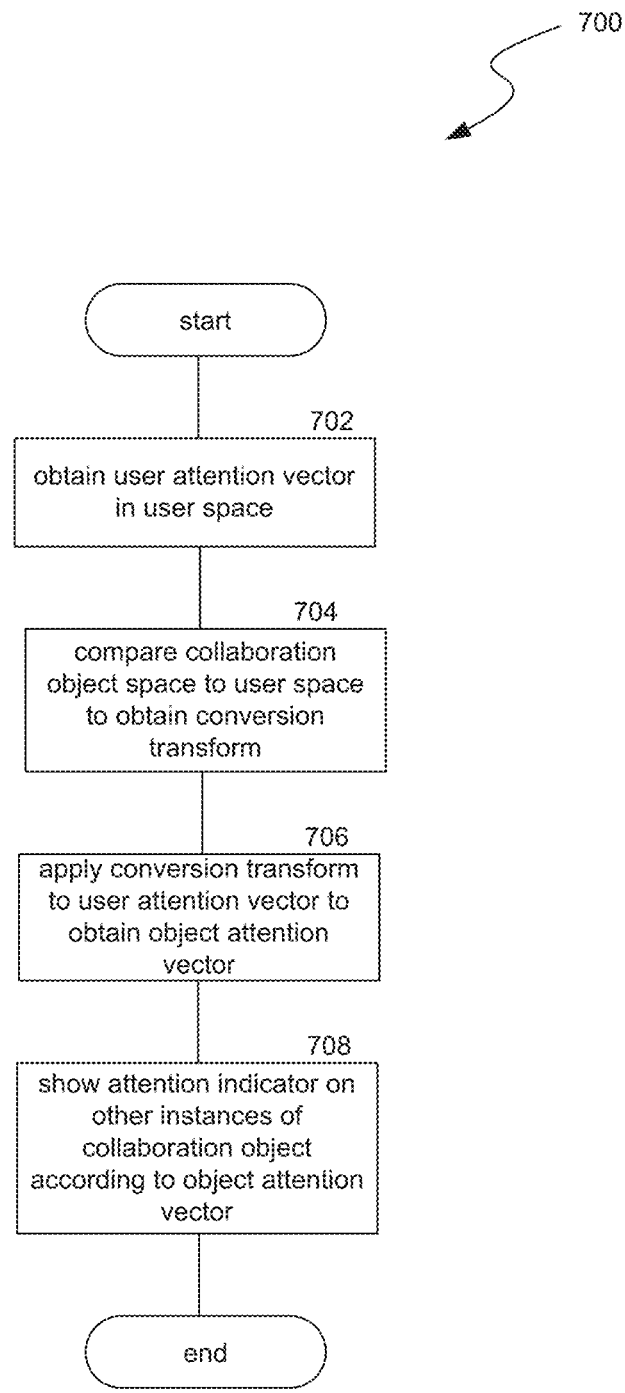
FIG. 7 is a flow diagram illustrating a process used in some implementations for translating a user attention vector to a vector in a space of a collaboration object.

FIG. 7 is a flow diagram illustrating a process 700 used in some implementations for translating a user attention vector to a vector in a space of a collaboration object. Process 700 can be triggered by the user activating a viewpoint coordination mode, the user putting on an artificial reality equipment, pressing a button on a control device, or process 700 is always operating and the user entering the artificial reality environment triggers viewpoint coordination. In some cases, process 700 can be a sub-process of process 500 or 600, e.g., calling process 700 at block 506 or 606 or at another time when user attention needs to be put in the context of a collaboration object. Process 700 can be performed locally on the XR device or performed by cloud-based device(s) that can support user collaboration.

Figure 11B:
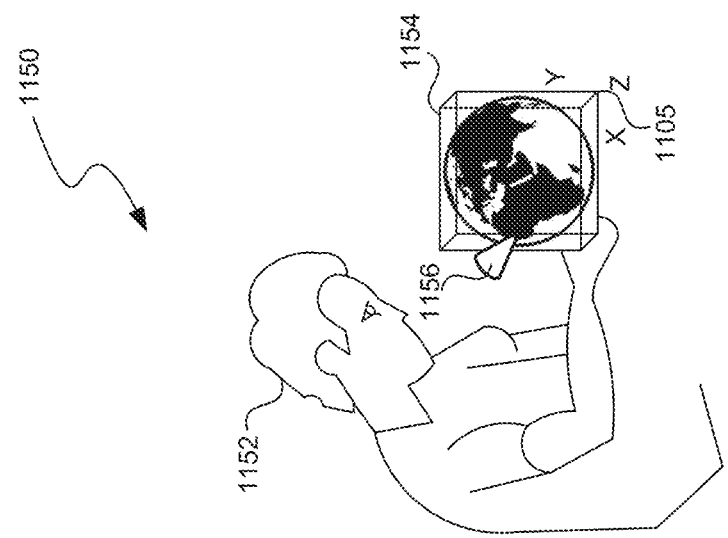
FIG. 11B is an illustration depicting the attention indicator of a user on collaboration object according to the object attention vector.
Figure 11A:
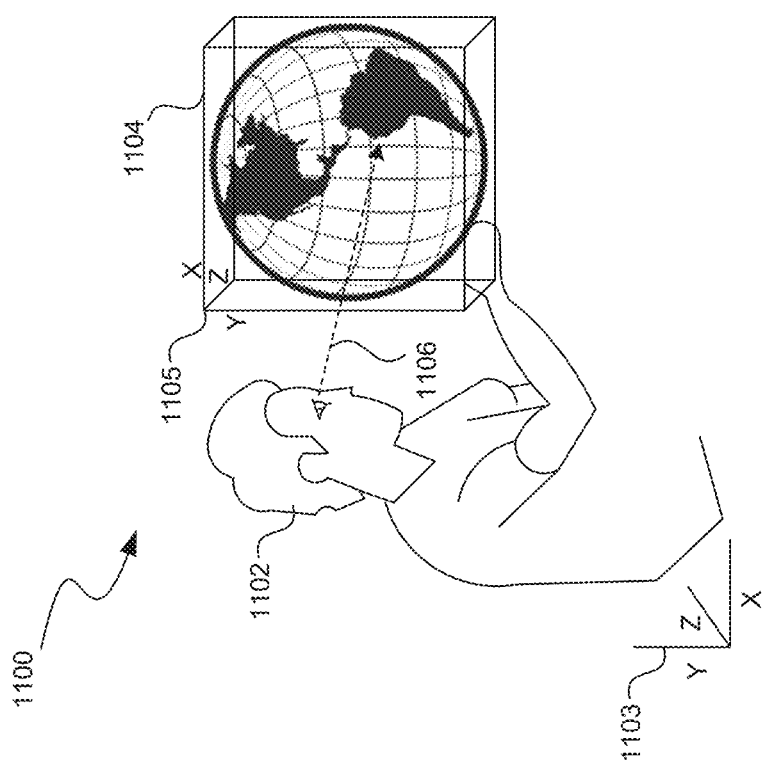
FIG. 11A is an illustration depicting the attention vector of a user translated into an object attention vector in the object space.

At block 702, process 700 can obtain a user attention vector in a user space. The user attention vector can be defined by the user's gaze, hand, finger, or any gesture to indicate the attention of the user. For example, the user's gaze is on an X-Y-Z coordinate system from the user's perspective. FIG. 11A illustrates environment 1100 in which the user's gaze 1106 of user 1102 in the user space with the X-Y-Z coordinate system 1103 of user 1102 perspective. Gaze 1106 is defined by the XR system in the X-Y-Z coordinate system 1103.

At block 704, process 700 can obtain a conversion transform by comparing a collaboration object space, defined by the one or more collaboration objects, to the user space. For example, the collaboration object space has a different X-Y-Z coordinate system from the X-Y-Z coordinate system of the user space. Process 700 can calculate the conversion necessary to translate the user's gaze in the user space into the object space. For example, process 700 can determine the offset and rotation between the corresponding axes of the collaboration object X-Y-Z coordinate system and user space X-Y-Z coordinate system. FIG. 11A illustrates environment 1100 in which the collaboration object X-Y-Z coordinate system 1103 can be compared to the collaboration object X-Y-Z coordinate system 1105 to determine a transform function between these coordinate systems.

At block 706, process 700 can obtain an object attention vector (defined in the collaboration object space) by applying the conversion transform from block 704 to the user attention vector. The transform can include offsets and rotation for coordinates to move position definitions from the user space to the collaboration object space. Applying the transform can define the user's gaze vector (e.g., user attention vector in user space) to a vector in the object coordinate system (e.g., object attention vector in the collaboration object space, i.e., defined relative to the collaboration object).

At block 708, process 700 can update one or more user attention indicators on one or more instances of the collaboration object based on the object attention vector. In some cases, the process 700 can show the attention indicator on other instances of the collaboration object according to the object attention vector. FIG. 11B illustrates environment 1150 in which another user 1152 is viewing another instance 1154 of the collaboration object. Instance 1154 of the collaboration object has the same collaboration object X-Y-Z coordinate system 1105 as instance 1104. A gaze 1156 is represented on the instance 1154 as defined by the object attention vector corresponding to user gaze 1106.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for collaborating on 3D objects in an artificial reality environment, the method comprising:
    identifying one or more 3D collaboration objects shared between multiple users, wherein the artificial reality environment includes a central instance or an individual instance of each of the one or more 3D collaboration objects;
    monitoring a respective attention of one or more of the multiple users on the central instance or the individual instance of a respective 3D collaboration object, of the 3D collaboration objects,
        wherein each respective attention is monitored by monitoring a gaze or a hand position of the respective user,
        wherein a respective user attention indicator is placed on the central instance or the individual instance of the respective 3D collaboration object to indicate a current location of the respective attention on the central instance or the individual instance of the respective 3D collaboration object, and
        wherein an instance of each user attention indicator, corresponding to a respective user, is viewable by each of the one or more other users;
    updating, based on the monitored respective attention of the one or more of the multiple users indicating a change in location of the respective attention to a respective new location on the central instance or the individual instance of the respective 3D collaboration object, the respective user attention indicator by moving the respective user attention indicator to indicate the respective new location on the central instance or the individual instance of the respective 3D collaboration object; and
    ceasing collaboration between the multiple users on the central instance or the individual instance of the respective 3D collaboration object.

2. The method of claim 1,
    wherein the artificial reality environment includes both the central instance and the individual instance of the respective 3D collaboration object; and
    wherein a manipulation to the individual instance of the respective 3D collaboration object does not change the central instance.

3. The method of claim 1,
    wherein the artificial reality environment includes both the central instance and the individual instance of the respective 3D collaboration object; and
    wherein the method further comprises:
        determining the individual instance of the respective 3D collaboration object was manipulated by one of the multiple users; and
        updating the central instance of the respective 3D collaboration object based on the manipulated individual instance of the respective 3D collaboration object.

4. The method of claim 1, wherein a 3D mesh and skin of the individual instance of the respective 3D collaboration object matches a 3D mesh and skin of the central instance of the respective 3D collaboration object.

5. The method of claim 1
    wherein the artificial reality environment includes at least the individual instance of the respective 3D collaboration object; and
    wherein the method further comprises:
        monitoring interactions of the one or more of the multiple users to update a configuration of the individual instance of the respective 3D collaboration object;
        updating a respective first user attention indicator in a collaboration object space defined for the one or more 3D collaboration objects; and
        updating a respective second user attention indicator on the individual instance of the respective 3D collaboration objects based on the respective first user attention indicator in the collaboration object space.

6. The method of claim 1 further comprising:
    obtaining a user attention vector in a user space;
    obtaining a conversion transform by comparing a collaboration object space, defined by the one or more collaboration objects, to the user space; and
    obtaining an object attention vector in the collaboration object space by applying the conversion transform to the user attention vector;
    wherein the updating the one or more respective user attention indicators on the central instance or the individual instance of the respective 3D collaboration object is based on the object attention vector.

7. The method of claim 1, wherein updating a respective user attention indicator is performed based on the respective user attention being on a same location on the central instance or the individual instance of the respective 3D collaboration object for a threshold amount of time.

8. The method of claim 1,
    wherein the method further comprises receiving, by a first user from a second user, a tag with an annotation on an instance of the one or more 3D collaboration objects other than the respective instance of the first user; and wherein the tag on the central instance of the respective 3D collaboration object of the second user is displayed on the respective instance of the respective 3D collaboration object of the first user.

9. A computing system for collaborating on 3D objects in an artificial reality environment, the computing system comprising:
one or more processors; and
one or more memories storing instructions that, when executed by the one or more processors, cause the computing system to perform a process comprising:
identifying one or more 3D collaboration objects shared between multiple users;
monitoring a respective attention of one or more of the multiple users on a respective 3D collaboration object, of the 3D collaboration objects,
wherein each respective attention is monitored by monitoring a gaze or a hand position of the respective user, wherein a respective user attention indicator is placed on a version of the respective 3D collaboration object to indicate a current location of the respective attention on the version of the respective 3D collaboration object, and
wherein an instance of each user attention indicator, corresponding to a respective user, is viewable by each of the one or more other users; and
updating, based on the monitored respective attention of the one or more of the multiple users, indicating a change in location of the respective attention to a respective new location on the version of the respective 3D collaboration object, the respective user attention indicator by moving the respective user attention indicator to indicate the respective new location on the version of the respective 3D collaboration object.

10. The computing system of claim 9,
wherein the artificial reality environment includes both a central instance and an individual instance of each of the one or more collaboration objects, and the version is one of the central instance and the individual instance of the respective 3D collaboration object; and
wherein a manipulation to the individual instance of the respective 3D collaboration object does not change the central instance of the respective 3D collaboration object.

11. The computing system of claim 9,
wherein the artificial reality environment includes both a central instance and an individual instance of each of the one or more collaboration objects, and the version is one of the central instance and the individual instance of the respective 3D collaboration object; and
wherein the process further comprises:
determining the individual instance of the respective 3D collaboration object was manipulated by one of the multiple users; and
updating the central instance of the respective 3D collaboration object based on the manipulated individual instance of the respective 3D collaboration object.

12. The computing system of claim 9,
wherein the artificial reality environment includes both a central instance and an individual instance of each of the one or more collaboration objects, and the version is one of the central instance and the individual instance of the respective 3D collaboration object; and wherein a 3D mesh and skin of the individual instance of the respective 3D collaboration object matches a 3D mesh and skin of the central instance of the respective 3D collaboration object.

13. The computing system of claim 9,
wherein the artificial reality environment includes at least an individual instance of each of the one or more collaboration objects, and the version is the individual instance of the respective 3D collaboration object; and
wherein the process further comprises:
monitoring interactions of the one or more of the multiple users to update a configuration of the respective individual instance of the respective 3D collaboration object;
updating a respective first user attention indicator in a collaboration object space defined for the one or more 3D collaboration objects; and
updating a respective second user attention indicator on the individual instance of the respective 3D collaboration objects based on the respective first user attention indicator in the collaboration object space.

14. The computing system of claim 9, wherein the process further comprises:
obtaining a user attention vector in a user space;
obtaining a conversion transform by comparing a collaboration object space, defined by the one or more collaboration objects, to the user space; and
obtaining an object attention vector in the collaboration object space by applying the conversion transform to the user attention vector;
wherein the updating the one or more user attention indicators on the version of the respective 3D collaboration objects is based on the object attention vector.

15. The computing system of claim 9, wherein updating a respective user attention indicator is performed based on the respective user attention being on a same location on the version of the respective 3D collaboration object for a threshold amount of time.

16. A non-transitory machine-readable storage medium having machine-executable instructions stored thereon that, when executed by one or more processors, direct the one or more processors to perform a method for collaborating on 3D objects in an artificial reality environment, the method comprising:
identifying one or more 3D collaboration objects shared between multiple users;
monitoring a respective attention of one or more of the multiple users on a respective 3D collaboration object, of the one or more 3D collaboration objects,
wherein each respective attention is monitored by monitoring a gaze or a hand position of the respective user,
wherein a respective user attention indicator is placed on a version of the respective 3D collaboration object to indicate a current location of the respective attention on the version of respective 3D collaboration object, and
wherein an instance of each user attention indicator, corresponding to a respective user, is viewable by each of the one or more other users; and
updating, based on the monitored respective attention of the one or more of the multiple users, indicating a change in location of the respective attention to a respective new location on the version of the respective 3D collaboration object, the respective user attention indicator by moving the respective user attention indicator to indicate the respective new location on the version of the respective 3D collaboration object.

17. The non-transitory machine-readable storage medium of claim 16,
wherein the artificial reality environment includes both a central instance and an individual instance of each of the one or more collaboration objects, and the version is one of the central instance and the individual instance of the respective 3D collaboration object; and
wherein a manipulation to the individual instance of the respective 3D collaboration object does not change the central instance of the respective 3D collaboration object.

18. The non-transitory machine-readable storage medium of claim 16,
wherein the artificial reality environment includes both a central instance and an individual instance of each of the one or more collaboration objects, and the version is one of the central instance and the individual instance of the respective 3D collaboration object; and
wherein the method further comprises:
determining the individual instance of the respective 3D collaboration object was manipulated by one of the multiple users; and
updating the central instance of the respective 3D collaboration object based on the manipulated individual instance of the respective 3D collaboration object.

19. The non-transitory machine-readable storage medium of claim 16,
wherein the artificial reality environment includes both a central instance and an individual instance of each of the one or more collaboration objects, and the version is one of the central instance and the individual instance of the respective 3D collaboration object; and
wherein a 3D mesh and skin of the individual instance of the respective 3D collaboration object matches a 3D mesh and skin of the central instance of the respective 3D collaboration object.

* * * * *